H. HESS.
JOURNAL BEARING.
APPLICATION FILED JUNE 26, 1907.
931,924.
Patented Aug. 24, 1909.
2 SHEETS—SHEET 1.
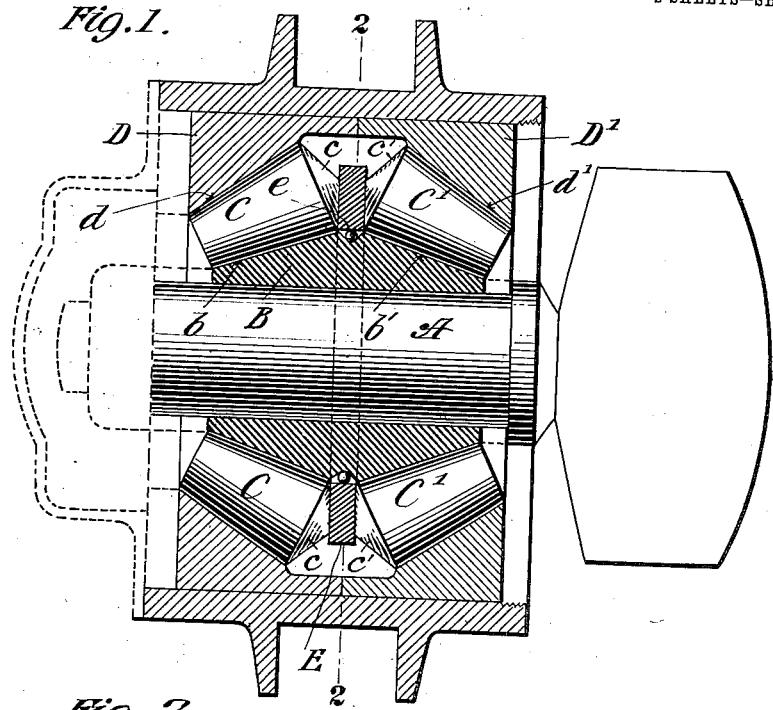
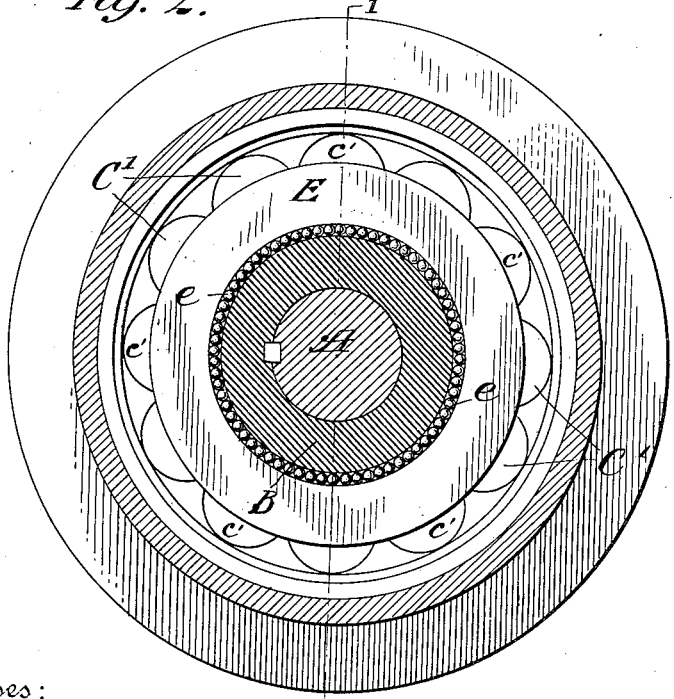
Witnesses:
Inventor:
HENRY HESS
By his Attorney

H. HESS.
JOURNAL BEARING.
APPLICATION FILED JUNE 26, 1907.

931,924.

Patented Aug. 24, 1909.
2 SHEETS—SHEET 2.

Witnesses:
Frank S. Ober
Waldo M. Chapin

Inventor:
HENRY HESS
By his Attorney
Robert Wilder Rogers

UNITED STATES PATENT OFFICE.

HENRY HESS, OF WAWA, PENNSYLVANIA.

JOURNAL-BEARING.

931,924.

Specification of Letters Patent.  Patented Aug. 24, 1909.

Application filed June 26, 1907. Serial No. 380,950.

*To all whom it may concern:*

Be it known that I, HENRY HESS, a citizen of the United States, residing at Wawa, in the county of Delaware and State of Pennsylvania, have invented certain new and useful Improvements in Journal-Bearings, of which the following is a specification, reference being had therein to the accompanying drawings.

My invention relates to journal bearings, and more particularly to that class thereof designed to sustain both radial and end thrust from the connected parts. In the present case it is shown as applied to bearings of a type known in the art and illustrated for instance in the Letters-Patent to C. S. Lockwood, No. 813,905, February 27, 1906. In the Letters-Patent mentioned, the rollers are of the well known conical type and are provided at their ends with additional conically-formed crowns or apices, which latter are designed to sustain the end thrust on the bearing. The rollers are arranged in double series and so that the crowns or apices of one series abut against and roll in contact with the crowns or apices of the other series. In practice, due to slight irregularities in the shape or size of the rollers or of the race-way wherein they travel, such irregularities arising either from defects in original construction or from subsequent wear, it often happens that the exact alinement of the rollers is lost, and consequently that the friction and resistance in the bearing is largely increased thereby, and that the durability and life of the parts are further impaired.

It is the purpose of my invention to correct this imperfect alinement, and I therefore employ an independently rotatable part or member having a continuous bearing-surface, against which the conical crowns or apices abut. This member may be formed and arranged in many different ways, some of which are herein illustrated and described.

Figure 3:
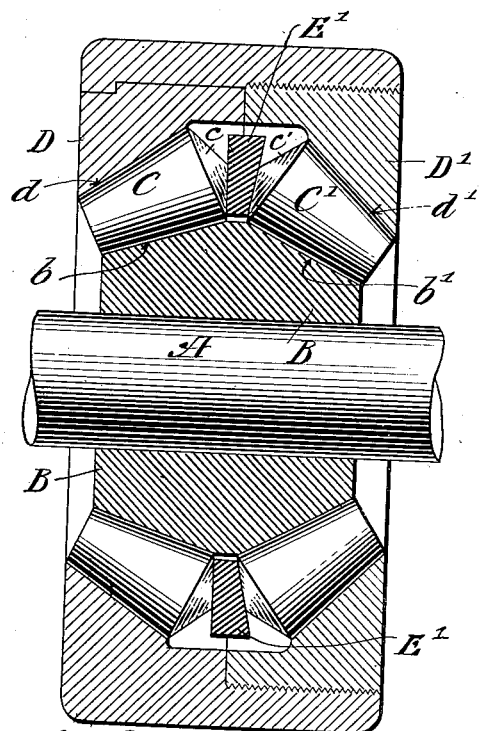
Figure 4:
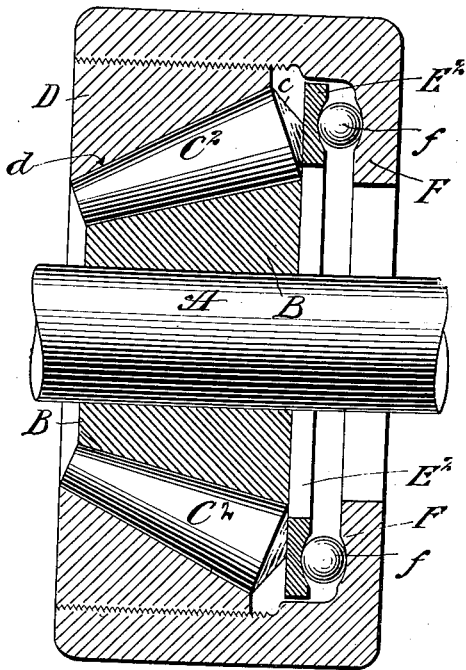
Figure 5:
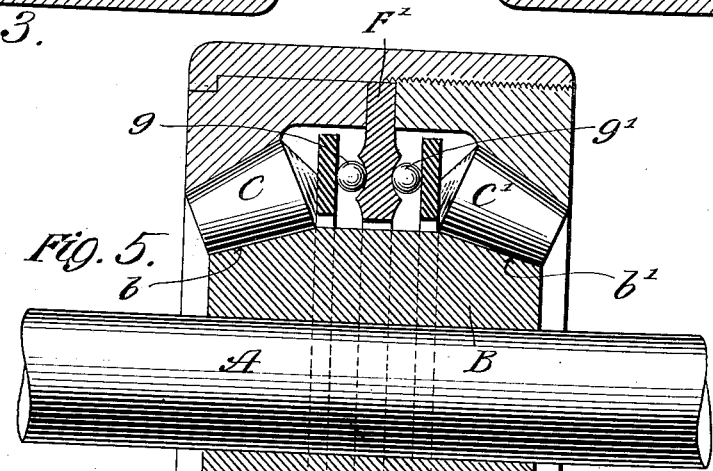

Referring to the drawings: Figure 1 is a longitudinal sectional view of a bearing embodying my invention, taken substantially on the line 1—1 of Fig. 2. Fig. 2 is a transverse sectional view, taken substantially on the line 2—2 of Fig. 1. Figs. 3, 4, and 5 are sectional views, similar to that given in Fig. 1, but showing different forms and adaptations of my invention.

In Figs. 1 and 2, the bearing is shown as composed of two outer pieces D and $D^1$, and an inner piece B connected to the shaft A. The pieces D and $D^1$ are provided with inclined surfaces $d$ and $d^1$, and the piece B with inclined surfaces $b$ and $b^1$, between which surfaces $d$, $d^1$, and $b$, $b^1$, the conical rollers C, C, and $C^1$, $C^1$ are received and held in angular relation to the shaft, all in the customary manner, and so as to provide anti-frictional support to the radial pressure upon the bearing. The rollers C, C, and $C^1$, $C^1$, also have conically-formed crowns or ends, $c$, $c$, and $c^1$, $c^1$, respectively, which are designed to take the end-thrust, and which abut against and have a rolling contact with the plate, ring, or washer E, formed with an unbroken or continuous surface, so as to reduce to a minimum the friction thereon. The ring E is held in position between the two series of rollers C, C, and $C^1$, $C^1$, each series thus opposing the end thrust on the other. In the form shown the ring E is mounted on anti-friction balls, $e$, $e$, disposed about the piece B, and is therefore capable of a rotational movement within the bearing, thus still further reducing the resistance and friction of the parts.

In Fig. 3, the arrangement is substantially similar to that just described, except that to provide for a difference in the amount of end thrust from opposite sides, the rollers $C^1$, $C^1$, do not occupy the same angular relation with respect to the rollers, C, C. This necessitates a change in the cross-sectional form of the ring or plate $E^1$, as will be apparent from the drawing. It may also be noted that the ring $E^1$ is capable of rotational movement in the bearing, although not provided with the anti-friction balls, previously mentioned.

In Fig. 4, where end thrust in one direction only is to be taken up, only one series of rollers $C^2$, $C^2$, is illustrated, and hence a different means is necessary for mounting the ring or plate $E^2$, which is shown as in contact with anti-friction balls $f$, $f$, disposed between the ring $E^2$ and the end plate F of the bearing. In this way, not only is resistance afforded to end thrust, but the ring is capable of rotational movement, as before.

In Fig. 5, the devices are substantially a duplication of those in Fig. 4, there being two sets of rollers, as in Fig. 1, two resisting rings $E^3$ and $E^4$, and two sets of anti-friction-balls, $g$, $g$, and $g^1$, $g^1$,—the rings and anti-friction balls being disposed on opposite sides of an internally-arranged flange F¹ of the bearing.

These and many other modifications I regard as comprised within the scope of my invention, which in its broad form is the combination of angularly arranged rollers having conical crowns or apices and an independently rotatable bearing-member against which they abut and roll.

Having thus described my invention, what I claim and desire to secure by Letters-Patent of the United States is as follows:

1. In a journal bearing, the combination with casing members and a series of angularly arranged rollers, each having at its end a conically-formed abutting portion, of a suitably supported independently rotatable member having a continuous bearing-surface which contacts with the said abutting portions, the said member thus affording resistance to the end thrust on the rollers.

2. In a journal bearing, the combination with casing members and a series of conical rollers, each having also a conically-formed abutting portion, of a suitably supported independently rotatable member having a continuous bearing-surface which contacts with the said abutting portions, the said member thus affording resistance to the end thrust on the rollers.

3. In a journal bearing, the combination with casing members and a series of angularly arranged rollers, each having at its end a conically-formed abutting portion, of an independently rotatable member having a continuous bearing-surface which contacts with the said abutting portions, the said member being suitably supported and mounted to turn in the journal bearing and to afford resistance to the end thrust on the rollers.

In testimony whereof I have affixed my signature in presence of two witnesses.

HENRY HESS.

Witnesses:
 NETTIE L. HAHN,
 M. M'CALLA.